US012762698B2

(12) United States Patent
Ciritsis et al.

(10) Patent No.: US 12,762,698 B2
(45) Date of Patent: Oct. 13, 2026

(54) METHOD FOR IMPROVING THE PERFORMANCE OF MEDICAL IMAGE ANALYSIS BY AN ARTIFICIAL INTELLIGENCE AND A RELATED SYSTEM

(71) Applicant: B-RAYZ AG, Schlieren (CH)

(72) Inventors: Alexander Philipp Ciritsis, Lucerne (CH); Andreas Boss, Zurich (CH); Cristina Rossi, Zurich (CH)

(73) Assignee: B-RAYZ AG, Schlieren (CH)

( * ) Notice: Subject to any disclaimer, the term of this patent is extended or adjusted under 35 U.S.C. 154(b) by 190 days.

(21) Appl. No.: 18/565,092

(22) PCT Filed: May 30, 2022

(86) PCT No.: PCT/EP2022/064648

§ 371 (c)(1),
(2) Date: Nov. 29, 2023

(87) PCT Pub. No.: WO2022/253774

PCT Pub. Date: Dec. 8, 2022

(65) Prior Publication Data

US 2024/0242349 A1 Jul. 18, 2024

(30) Foreign Application Priority Data

May 31, 2021 (CH) .................................... 00630/21

(51) Int. Cl.
*G06T 7/00* (2017.01)
*G06V 10/764* (2022.01)
(Continued)

(52) U.S. Cl.
CPC .......... *G06T 7/0012* (2013.01); *G06V 10/764* (2022.01); *G06V 10/774* (2022.01); *G06V 10/776* (2022.01); *G06V 2201/03* (2022.01)

(58) Field of Classification Search
CPC ....... G06T 7/0012; G06T 7/774; G06T 7/776; G06T 7/764; G06V 2201/03
(Continued)

(56) References Cited

U.S. PATENT DOCUMENTS 9,536,054 B1 1/2017 Podilchuk et al.
2017/0200266 A1 7/2017 Podilchuk et al.
(Continued)

FOREIGN PATENT DOCUMENTS

EP 3432313 A1 1/2019

OTHER PUBLICATIONS

PCT International Search Report for corresponding International Application Serial No. PCT/EP2022/064648, mailed Aug. 25, 2022, pp. 1-3.
(Continued)

*Primary Examiner* — Joseph G Ustaris
(74) *Attorney, Agent, or Firm* — Tarolli, Sundheim, Covell & Tummino LLP

(57) ABSTRACT

The invention relates to the field of classifying, using an artificial intelligence, medical images showing a body portion. The invention provides a method for adapting to a specific user a model of an artificial intelligence for classifying images of a body portion, wherein the method is integrated in the user's everyday workflow in a manner that the execution of the method has no or nearly no impact on the user's everyday work. Therefore, user-specific data elements 24 are generated in an automated manner (step S2) during the user's work. A user-specific data element 24 comprises a medical image of the body portion to be classified and a classification 26 (also called label) approved or corrected by the user, wherein the image is taken by the user or a medical imaging system of the user during normal, everyday work. The model is adapted to the user by gener-
(Continued)

ating a training data set 27 comprising user-specific data elements 24, by training the artificial intelligence on the training data set 27 for generating an adapted model 2 (step S3), and by replacing a current model 1 of the artificial intelligence used by the user with the adapted model 2 if a replacement criterion is fulfilled (step S5).
The invention provides further a method for improving the performance of a system 100 for classifying images of a body portion and a system 100 related to the mentioned methods.

17 Claims, 6 Drawing Sheets

(51) Int. Cl.
*G06V 10/774* (2022.01)
*G06V 10/776* (2022.01)

(58) Field of Classification Search
USPC .......................................................... 382/128
See application file for complete search history.

(56) References Cited

U.S. PATENT DOCUMENTS

| | | | | |
|---|---|---|---|---|
| 2019/0189264 | A1 | 6/2019 | Stoval, III et al. | |
| 2019/0223845 | A1 | 7/2019 | Podilchuk et al. | |
| 2020/0211694 | A1 | 7/2020 | Nye et al. | |
| 2021/0042916 | A1 | 2/2021 | Zhang et al. | |
| 2021/0089921 | A1 | 3/2021 | Aghdasi et al. | |
| 2022/0309767 | A1* | 9/2022 | Keefe .................. | G06V 10/764 |
| 2022/0318567 | A1* | 10/2022 | Muhamedrahimov ...................... | G06F 18/23 |

OTHER PUBLICATIONS

Ciritsis, A, Rossi C, Vittoria De Martini I, Eberhard M, Marcon M, Becker AS, et al. Determination of mammographic breast density using a deep convolutional neural network. Br J Radiol 2019; 92: 20180691.

* cited by examiner

METHOD FOR IMPROVING THE PERFORMANCE OF MEDICAL IMAGE ANALYSIS BY AN ARTIFICIAL INTELLIGENCE AND A RELATED SYSTEM

RELATED APPLICATIONS

This application is a U.S. National Stage Application filed under 35 USC 371, claiming priority to Serial No. PCT/EP2022/064648, filed on 30 May 2022; which claims priority from Patent Application Serial No. 00630/21, filed 31 May 2021, the entireties of which are hereby incorporated herein by reference.

FIELD OF THE INVENTION

The invention relates to the field of classifying, using an artificial intelligence, medical images showing a body portion, wherein the medical images are classified in dependence of a characteristic of the body portion shown. The general state of the body portion or a feature thereof, a density or density distribution of the body portion or a feature thereof, a shape or shape distribution of the body portion or a feature thereof, a color or color distribution of the body portion or a feature thereof, a distribution of tissue of the body portion or a feature thereof, a deviation of the body portion or a feature thereof from a state considered as normal, and a state of health of the body portion or a feature thereof are examples of characteristic of the body portion according to which the image may be classified.

BACKGROUND OF THE INVENTION

Classifying a medical image means that the medical image is classified into categories. Thereby, the categories may represent at least one of different states of a characteristic of the body portion shown, for example different states of at least one of the above-mentioned characteristics, and recommended clinical actions, for example.

In particular, the invention relates to a method for improving, in the eye of a specific user, the classification performance of the artificial intelligence used. In other words, the invention relates to a method for adapting a model of an artificial intelligence for classifying images, wherein the model is adapted in a manner that its classification performance is considered by a specific user as improved. In even other words, the invention relates to a method for providing a custom-specific (user-specific) model of an artificial intelligence for classifying images.

The invention relates further to a related system.

As mentioned, the classification that is improved in the eye of a specific user comprises a classification of a body portion shown in the image. This means that the classification does not or not exclusively concern settings of the image, the quality of the image and/or the localization of an object (feature) in the image, for example. However, the method may comprise a step of classifying, using a model of an artificial intelligence, the image according to its settings, its quality and/or to the position of a feature, for example to determine whether the image is suitable for a classification of the body portion shown according to (this means in dependence of) a characteristic of the body portion shown.

The body portion shown may be any body portion of a human or animal being and the classification may concern any medical case, such as an assessment of the probability of a lesion being a cancer lesion or the probability of later forming of a cancer lesion or any other suffer.

For example, the classification that is improved in the eye of a specific user comprises a classification of the body portion shown in the image (or a feature thereof) into categories according to a medical Reporting and Data System guideline, such as BI-RADS (Breast Imaging Reporting and Data System), PI-RADS (Prostate Imaging Reporting and Data System), TI-RADS (Thyroid Imaging Reporting and Data System), LI-RADS (Liver Imaging Reporting and Data System), or Lung-RADS.

One important issue related to the classification of a body portion (or a feature thereof) shown in a medical image is the accuracy of the classification made by the model of the Artificial Intelligence (AI) used, in particular if one of various possible further clinical actions is triggered by the classification of the body portion (or a feature thereof) shown. The state-of-the-art addresses this issue in different ways:

According to a first approach, the model of the AI used for the classification of the medical images is calibrated during setting up the AI at the user. For example, EP 3432313 A1 shows a method for training an image analysis system comprising a deep neural network, said method comprising a calibration of the deep neural network using a set of training data stored in a memory, wherein a variable, for example a label, associated with an image of the stored set of training data is determined, confirmed or corrected by the user. US 2017/0200266 A1 shows a method to enhance clinical decision-making capability by use of a trained computer-assisted diagnosis (CAD) computing device, wherein a CAD training process includes an initial training phase. The initial training phase comprises calibrating the CAD computing device by a personalized training data set that is used by the user and comprises further the establishment of a weighted error function such that the probability of a correct classification of clinical difficult cases is increased. However, addressing the accuracy issue according to the first approach leads to a static AI after setting up the AI at the user. This means that any changes and developments that may influence what the user considers as a high accuracy will not be reproduced by the static AI after its calibration at the user. Further, the static AI will be user-specific to a very limited extend only—if at all. This is because the training data set used during setting-up is limited and it is usually originating from the user.

According to a second approach, it is tried to improve constantly the accuracy by providing to the user further training data and by retraining the model of the AI from time to time. The method disclosed in EP 3432313 A1 comprises optionally such a retraining during the lifetime of the image analysis system. However, such a retraining is resource intensive in terms of gathering the further training data, of assessing the further training data by the user, and of retraining the model, at least.

According to a third approach, it is tried to improve the accuracy of the clinical difficult cases, as mentioned briefly above. The initial training phase of the method disclosed in US 2017/0200266 A1 does not only comprise a personalized training data set that is used by the user to calibrate the CAD computing device but it comprises further the establishment of a weighted error function such that the probability of a correct classification of clinical difficult cases is increased (also called "weighted or penalty-based training phase"). However, this approach may result in a decreased accuracy of clinical cases that may be considered as less difficult, this means that any classification carried out by the AI needs to be reconsidered in detail by the user because the user cannot trust in the proposed classification.

According to a fourth approach, further information that may assist the user in assessing the correctness of a classification provided by the used model of the AI is generated and provided to the user. U.S. Pat. No. 9,536,054 B1 discloses a method in which a training phase of a CAD system comprising an AI is not only used to calibrate the model of the AI but also to familiarizing the user with strengths and weaknesses of the provided CAD system and to collect data that allow for the generation of a confidence level indicator (CLI) during use of CAD system, this means subsequent to the training phase. However, also this approach is time-consuming for the user and complex, in particular if the CLI is determined by a further Artificial Intelligence.

One reason why state-of-the-art approaches do not consider the generation of a true user-specific model of an AI for classifying medical images is that it is assumed that there is a category considered as correct by the community of users. However, this point of view does not need to be correct. The category that is considered as correct by a specific user depends on various user-specific parameters, such as its risk tolerance for non-optimal or not needed clinical actions, its positioning in the market, or its personal experience.

A further reason why state-of-the art approaches do not consider the generation of a true user-specific model of an AI is that regulatory authorities do often not accept medical facilities that are non-static, this means that may change one of their basic settings in a manner that is not conclusively defined during medical approval by the regulatory authorities. However, this reason may be overcome by an appropriate control mechanism, for example the control mechanism integrated in some embodiments of the method according to the invention.

SUMMARY OF THE INVENTION

It is an object of the invention to provide a method for classifying, using an artificial intelligence, medical images showing a body portion, wherein the medical images are classified into categories in dependence of (according to) a characteristic of the body portion shown or a feature thereof shown, wherein the method overcomes drawbacks of methods according to the state-of-the-art.

In particular, it is an object of the invention to provide a method for adapting a model of an AI for classifying medical images of a body portion according to a characteristic of the body portion shown, wherein the classification performance of the adapted model is considered as improved by a specific user. Consequently, it is an object of the invention to provide a method for providing a custom-specific (user-specific) model of an AI for classifying medical images of a body portion according to a characteristic of the body portion shown. It is a further object of the invention to provide a related system for classifying medical images, the adapted model itself, a related computer program, a related computer readable medium, and a related data carrier signal.

In particular, it is an object of the invention to provide a method for adapting a model of an AI for classifying medical images of a body portion according to a characteristic of the body portion shown, wherein the classification performance, in the eye of a user, improves steadily. It is a further object of the invention to provide a related system, the adapted model itself, a related computer program, a related computer readable medium, and a related data carrier signal.

In particular, it is an object of the invention that the above-mentioned objects and benefits are realized with a minimum contribution of the user, for example by the method being integrated in the normal workflow and/or by the method being carried out in an automated manner to a large extend, at least.

At least one of the objects is achieved by the invention described in the following and/or the invention claimed in the claims.

The following terms have the following meaning if not stated otherwise:

The term "user" has a broad meaning including a single person, such as a trained medical professional, for example a practitioner, radiologist etc., a group of persons, such as a group of trained medical professionals, for example a group of practitioners, radiologists etc., and a medical facility (medical institution) with its members, in particular with its trained medical professionals.

Something is carried out, for example an image is taken and/or provided, an image is classified and/or a user input is given or received, "during the user's normal work" if it is carried by the user while the user fulfills its (this means the user's) main task, this means while the user carries out the workflow for providing, in particular providing directly, the service expected by its (this means the user's) customers. In other words, "during the user's routine work", in particular "during the user's daily routine work", "during the user's routine operation", in particular "during the user's daily routine operation", or "during the user's everyday (daily, day-to-day) work" may be used instead of "during the user's normal work".

With respect to the invention, the main task (the expected service) is or comprises at least one of acquisition of an image of a body portion of a current patient and giving a medical assessment using an image of a body portion of a current patient. "During the user's normal work" means then during carrying out the steps immediately needed for acquiring an image of a body portion of a current patient and/or for assessing an image of a body portion of a current patient.

In many embodiments, the main task (the expected service) is or comprises acquisition of an image of a body portion of a current patient and giving a medical assessment using this image. "During the user's normal work" means then during carrying out the steps immediately needed for acquiring an image of a body portion of a current patient and for assessing this image.

However, "during the user's normal work" does not include further tasks that may be fulfilled by the user and that do not contribute directly to the fulfillment of the user's main task and that do not contribute directly for providing the expected service. Installation of equipment, setting-up equipment, in particular new equipment, or maintenance of equipment are examples of further tasks that may be carried out by the user but that do not contribute directly to the fulfillment of the user's main task and that do not contribute directly for providing the expected service. Therefore, such further tasks are not covered by the term "during the user's normal work".

The term "model" of an AI is used for the parameter set, for example the vector, that determines the configuration of the AI, wherein the AI is a specific AI, this means an AI designed for a specific purpose, such as assigning an input to an output. In the present invention, the input is a medical image and the output is a category, also called label, class or classification in the following. In other words, the model (or parameter set) comprises, usually consists of, all so-called free parameters of the AI, this means all parameters that are determined or changed during training of the AI using a training data set. The term "model" does not include the so-called hyperparameters that define the structure of the AI itself.

The model may be considered as the output of a training of the AI.

The present invention relates to different models of a given (specific) AI, said AI being configured to classify input medical images into categories. The models differ due to differences in the training data set used for training the AI.

The manner the AI assigns an input to an output depends on the model used in the AI, this means on the model according to which the AI is configured. In other words, the "model" used determines how a given (specific) AI assigns an input (a medical image in the present invention) to an output (a category in the present invention).

Due to the above, the term "model" may be considered as a configuration parameter set or a set of defined, this means set, determined, specific . . . , free parameters, for example.

The AI may differ in dependence on its concrete field of application, this means in dependence on the kind of input medical images and/or categories into which the input medical images are classified.

In many embodiments, the AI is given by a deep convolutional neural network (dCNN). However, the method and system provided by the present invention are not restricted to a specific type of AI. In fact, the method and system provided by the present invention are not even restricted to the medical sector or medical images as input. Rather, the method and system may work in general, in particular for any AI configured to assign an input image to one of a plurality of categories.

An exemplary embodiment of a dCNN for the classification of input mammography projections into the four categories given by ACR BI-RADS is described in Ciritis A, Rossi C, Vittoria De Marini I, Eberhard M, Macron M, Becker A S, et al. Determination of mammographic breast density using a deep convolutional neural network. Br J Radiol 2019; 92: 20180691. The content of this publication is herein incorporated by reference.

For a specific application, the structure of the AI may be considered as static and it is the model that changes the performance of the AI, only. Therefore, testing the AI configured according to a specific model, determining/assessing/comparing a classification performance of the AI configured according to a specific model, retraining the AI configured according to a specific model etc. may be considered as equivalent to testing the specific model, determining/assessing/comparing a classification performance of the specific model, retraining the specific model etc.

The term "medical image" has a broad meaning and includes any radiologic image and any image derived thereof, any photograph taken for medical purpose, for example photos used to document skin lesions, and any image derived thereof, any image taken by sonography (e.g. hand-held sonography, 3D-sonography) and any image derived thereof, any image taken by MRI and any image derived thereof, any image taken by CT and any image derived thereof, any images taken using Tomosynthesis and any image derived thereof, for example.

A method according to the invention is a method for adapting a model of an AI to a specific user, this means to a particular user of a plurality of actual or potential users. This also means that a method according to the invention may be considered as a method for providing a user-specific (custom-specific) model of an AI. The AI is an AI configured (designed, set-up) for classifying images of a body portion into categories, wherein the classification depends on a characteristic of the body portion shown in the image, in particular on a tissue and/or cell characteristic that is shown in the image. The term "tissue" is used in the following for "tissue and/or cell". In particular, the classification may depend on at least one of: tissue distribution, tissue density, tissue density distribution, tissue composition, tissue formation, tissue structure etc. The characteristic and categories may be according to any example mentioned above, for example.

In particular, the characteristic may be or base on a tissue (this means tissue and/or cell) change, in particular a local tissue change and/or a pathological tissue change.

The adaption of the model may cause, in the eye of the specific user, an improved classification performance. The classification performance may be considered as improved by the specific user because the AI using the adapted model approximates at least one of the experiences, practice, risk tolerance, and "philosophy" of the specific user in a better manner than the non-adapted model.

For example, the classification of images showing medical cases that are not evident in terms of the category they belong to, this means that have, according to the AI, for two categories high and comparable probabilities, may be considered as improved.

For example, the AI may be more suitable for specific medical cases if it is configured according to the model adapted by the method. This means the AI is more suitable for a classification into a selection (subgroup) of categories, said medical cases and selections representing better the everyday work of the specific user. In other words, the AI becomes indication-specific by configurating it according to an adapted model.

The method according to the invention comprises:

- A step of providing a current model of the AI.
- In other words, the AI has been trained using a first training data set and the set of parameters that defines the configuration of the AI at the end of the training has been stored in a manner that it can be provided.
- The first training data set, as well as any other training data set used in the method for adapting a model of an AI for classifying images of a body portion, comprises training data elements, wherein a training data element comprises an image of the body portion and its classification, this means a label indicating the category to which it belongs. The training data set comprises training data elements of a plurality of patients.
- A step of providing a data set comprising at least one user-specific data element, this means a data element that comprises an image of the body portion that is taken and classified by the user.
- The image of the body portion is taken during the user's normal work and after generating the current model.
- In an embodiment, the image is classified by the user during the user's normal work as well, for example during studying the image for diagnostic purposes. Studying the images for diagnostic purposes may be supported by a computer-assisted diagnosis (CAD) system, for example. In particular if a CAD-system is used, the image may be classified by the user by approving or correcting a classification proposed by the CAD-system. The classification proposed by the CAD-system may be the classification according the AI configured according to the current model.
- The classification of the image according to the user may be read-out automatically from a report generated and/or approved by the user.

In an embodiment, the classification of the image may have a (small) influence on the user's normal work. For example, images of cases in which the user disagreed with a proposed classification and/or which clinical action arranged for by the user indicates that the user disagrees with the proposed classification may be provided to the user for classification. In other words, images having or having probably, according to the user, a wrong classification may be provided to the user for classification. The images may be at least one of provided to the user in an automated manner, provided to the user on the user's request, and provided batch-wise, this means a plurality of images, for example images collected over a certain period of time, are provided to the user for classification at once.

In summary, the data set comprises at least one data element that is not present in the first training data set (or in any other data set used for generating the current model). Further, this means that the image is not provided by a person or institution different from the user but by the user during the user's everyday work and the classification is not done during setting-up of an AI, system etc. at the user.

The user-specific data element is generated, and hence the user-specific data set is provided, in an automated manner. This means that the user is not aware of, or even cannot or must not be aware of, the generation of the user-specific data element and the data set that is provided. For example, the user carries out his/her everyday work comprising taking images of body portions and classifying them using, for example, a computer-aided diagnosis (CAD) system, wherein the CAD system is configured to generate the user-specific data element from the image taken and the classification made, to generate the data set and to provide the data set in an automated manner.

In particular, the classification by the user may comprise an approval or correction of a classification (category) proposed by the AI being configured according to the current model.

As mentioned above, the term "user" has a broad meaning. This means that the image may be taken by a first person of the "user" and the classification may be done by a second person of the "user". Then, the classification performance of the adapted model compared to the classification performance of the current model will improve in the eyes of the second person.

In an embodiment, the step of providing a data set comprises a substep of classifying, using the AI configured according to the current model, the image taken by the user and a substep of approving or correcting, by the user, the classification of the image determined using the AI configured according to the current model. Thereby, the image is labeled with a corrected classification determined by the user in case of correction of the classification determined using the AI configured according to the current model or the image is or remains labeled with the classification determined using the AI configured according to the current model in case of approval of the classification determined using the AI configured according to the current model.

The substep of approving or correcting, by the user, the classification of the image determined using the AI configured according to the current model may be carried out directly, this means by a user input, for example on a user interface, or indirectly, for example by reading it out of a report. The report read-out may be automated.

In an embodiment, the image of the body portion taken by the user and comprised in the user-specific data element is classified by the user in a step of classifying, wherein the step of classifying comprises or consists of at least one of: approving, in a direct or indirect manner, a proposed classification of the image, correcting, in a direct or indirect manner, a proposed classification of the image.

The proposed classification is usually the classification of the image proposed by the AI configured according to the current model.

A step of generating an adapted model of the AI, wherein the adapted model is generated by training the AI on a (second) training data set, wherein the training data set comprises a user-specific data element of the provided data set.

In other words, the AI is trained on a training data set that differs from the training data set used for generating the current model by comprising at least one (usually a plurality of) user-specific data element(s) and the set of parameters that defines the configuration of the AI at the end of the training has been stored in a manner that it can be provided.

The AI configured according to the current model may be trained on the training data set comprising the user-specific data element for generating the adapted model. In other words, the adapted model may be generated by retraining the current model.

Alternatively or in addition, transfer learning may be used during generation of the adapted model.

Usually, the training data set comprising a user-specific data element of the provided data set is generated in a manner without input and/or awareness of the user. For example, the training data set is generated in an automated manner, this means without contribution of any person.

Usually, the training data set comprising a user-specific data element of the provided data set is provided to a training unit configured to generate an adapted model of the AI by training the AI on the training data set comprising a user-specific data element of the provided data set in a manner without input and/or awareness of the user. For example, the training data set is provided to the training unit in an automated manner.

Usually, the adapted model is generated in a manner without input and/or awareness of the user. For example, the adapted model is generated in an automated manner.

In an embodiment, the step of generating an adapted model is carried out in an automated manner.

A step of determining a classification performance of the current model and a classification performance of the adapted model.

More precisely—and as mentioned above—a classification performance of the AI configured according to the current model and a classification performance of the AI configured according to the adapted model is determined.

The classification performance of the current model may be rather provided than determined in the step of determining a classification performance of the current model and a classification performance of the adapted model. For example, the classification performance of the current model may be determined at the end of the training of the AI for generating the current model.

The classification performance of the current and/or adapted model may be determined using at least one of a test data set comprising at least one further user-specific data element not used in the training data set, a test data set used for determining a classification performance at the end of the training of the AI for generating the current model, and a test data set provided by the provider of the AI or by any other institution.

The classification performance may comprise or consider any performance indicator used in the field of AI, such as accuracy, precision, recall and F-value, for example as given in G. Paass, D. Hecker, Künstliche Intelligenz, Springer (2020), page 77.

In an embodiment, the step of determining a classification performance, independent of its concrete realization, may be carried out in an automated manner.

A step of replacing the current model of the artificial intelligence with the adapted model of the artificial intelligence if a replacement criterion is fulfilled.

The current model may be stored on a memory that is part of a controller or on a memory that is in communication with a controller, wherein the controller is configured to classify images of the body portion using the artificial intelligence configured according to the stored model. In this case, the current model may be replaced with the adapted model on the memory if the replacement criterion is fulfilled.

In particular, the current model may be replaced with the adapted model in the analysis unit according to any embodiment disclosed below if the replacement criterion is fulfilled.

In principle, the replacement criterion may be or comprise any criterion that is suitable for determining whether the adapted model is better adapted to the user and/or whether the classification performance of the adapted model performs better than the classification performance of the current model. However, the replacement criterion is or comprises usually the criterion whether the classification performance of the adapted model is better than the classification performance of the current model.

In other words, the method comprises usually a step of replacing the current model of the artificial intelligence with the adapted model of the artificial intelligence if the classification performance of the adapted model is better than the classification performance of the current model.

The classification performance of the current and adapted models may be comparable by comprising or considering any performance indicator used in the field of AI, such as accuracy, precision, recall and F-value.

The step of replacing the current model with the adapted model is carried out after calibrating and/or setting-up the AI at the user. This is due to the manner the user-specific data elements used during generation of the adapted model is generated.

An important aspect of any method or system used in the medical field is to exclude that the method or system behave in an unplanned manner that may decrease the performance of the method or system. This is why regulatory authorities ask for computer-implemented methods that are static. However, a behavior that may decrease the performance of a computer-implemented method in an unacceptable manner can be ruled out if a control mechanism guarantees that any change in behavior increases the performance in the eye of the responsible user, at least.

In an embodiment, the data set provided in the step of providing a data set comprises a plurality of user-specific data elements and the method comprises further a step of generating a test data set that comprises a user-specific data element that is not present in the training data set used for the generation of the adapted model. A user specific data element that is not present in the training data set used for the generation of the adapted model is called a further user-specific data element, in this text.

According to this embodiment, the step of determining a classification performance of the current model and a classification performance of the adapted model comprises testing the current and adapted models on the test data set comprising the further user-specific data element, this means determining a classification performance of the AI configured according to the current model by testing the AI configured according to the current model on the test data set generated and determining a classification performance of the AI configured according to the adapted model by testing the AI configured according to the adapted model on the test data set generated.

Usually, the test data set generated comprises a plurality of further user-specific data elements.

The test data set generated is more representative for the medical cases of the user, for the assignment of these cases to categories, and for the facilities and its settings used by the user. In particular, this is the case if the test data set generated comprises further user-specific data elements to a large extend. This guarantees, in combination with the replacement criterion that the classification performance of the adapted model needs to be better than the classification performance of the current model, that the classification performance can improve only in the eyes of the responsible user, this means the person or group of persons that classify the images of the body portion taken by the user. This is because the classification performance of the adapted model and of the current model is determined on the test data set generated.

In other words, the AI configured according to the adapted model performs better in the eyes of the responsible user.

Usually, an initial model of the AI is provided to the user, wherein the initial model is the current model until it is replaced in the step of replacing the current model with the adapted model. The initial model is tested on a test data set of the provider of the initial model, said test data being called the provider test data set in the following.

According to an embodiment and in order to make sure that the AI does not behave in an unplanned manner, the better classification performance of the adapted model than the classification performance of the current model may be a first criterion in the step of replacing the current model with the adapted model, only. For example, the classification performances may be determined using the test data set generated according to the previous embodiment.

Then, the method may comprise further a step of providing a classification performance threshold and a step of determining a classification performance of the adapted model on the provider test data set by testing the AI configured according to the adapted model on the provider test data set. A classification performance of the adapted model on the provider test data set that is higher than the classification performance threshold may then be a second criterion in the step of replacing the current model with the adapted model.

By doing so, it is made sure that the classification performance on the provider test data set, that may be a static test data set, this means it does not change over time, does not decrease below a static value, namely the classification performance threshold.

One may envisage further measures to rule out an unplanned behavior of the AI due to usage of the inventive method. For example, user-specific data sets may be reviewed, for example by the provider of the AI or another user, the history of changes in the classification performance may be considered before replacing the current model with the adapted model, and/or a replacement of the current model with the adapted model is not possible without approval by the user, wherein the approval may base on further information provided to the user, such as classification performances (for example on the test data set generated and/or on the provider test data set), changes in classification performances, the history of classification performances, and/or examples of images that will be classified differently if the current model is replaced by the adapted model.

In an embodiment, the method, more precisely the steps of the method, is/are carried out iteratively.

In particular, the step of providing a current model in any embodiment disclosed, the step of providing a data set comprising a least one user-specific data element in any embodiment disclosed, the step of generating an adapted model in any embodiment disclosed, the step of determining a classification performance in any embodiment disclosed, and the step of replacing the current model with the adapted model if the replacement criterion is fulfilled in any embodiment disclosed are carried out iteratively.

In particular, each of said steps in any embodiment disclosed is carried out within any sequence of said steps that is suitable for generating the adapted model and for providing it if the replacement criterion is fulfilled before the sequence is carried out again.

In other words, the method, more precisely the steps of the method, in particular a sequence of said steps that is suitable for generating the adapted model and for providing it if the replacement criterion is fulfilled, is/are carried out several times, this means at least two times.

At least one of the following may apply in two consecutive executions of the method, more precisely of the steps of the method, in particular of a sequence of said steps that is suitable for generating the adapted model and for providing it if the replacement criterion is fulfilled:

- The current model of the artificial intelligence that is provided in the second execution of the two consecutive executions is the model of the artificial intelligence that remains after the step of replacing carried out in the first execution of the two consecutive executions.
- In other words, the current model that is provided in the second execution of the two consecutive executions is the adapted model generated in the first execution of the two consecutive executions if the replacement criterion or, as the case may be, the replacement criterions, are fulfilled or it is (remains) the current model of the first execution of the two consecutive executions if the replacement criterion or, as the case may be, the replacement criterions, are not fulfilled.
- At least one user-specific data element that is generated subsequent to the step of providing a data set carried out in the first execution of the two consecutive executions is considered in the step of generating an adapted model carried out in the second execution of the two consecutive executions.
- Usually, a plurality of user-specific data elements that are generated subsequent to the step of providing a data set carried out in the first execution of the two consecutive executions is considered in the step of generating an adapted model, in particular in the training data set, and optionally in the step of determining a classification performance, in particular in the test data set, carried out in the second execution of the two consecutive executions.

In particular, but not exclusively, in embodiments in which the method, more precisely, the steps of the method, in particular a sequence of said steps that is suitable for generating the adapted model and for providing it if the replacement criterion is fulfilled, is carried out several time, the start of a step or the start of an execution of the method may be triggered by the fulfillment of a condition, for example at least one of the following conditions:

- The user and/or the provider of the AI initiates the start of a step or the execution of the method.
- For example, the user may start generating user-specific data elements, providing the data set comprising user-specific data elements and/or the generation of an adapted model after having classified the images provided to him batchwise or after having noticed or having been noticed that a plurality of user-specific data elements that have not been used in adapting the model so far have been generated.
- The user may be notified if sufficient user-specific elements for the generation of an adapted model is available.
- For example, the user may be notified if the replacement criterion or replacement criterions are fulfilled, in particular if the classification performance of the adapted model is better than the classification performance of the current model. Then, the step of replacing the current model by the adapted model may be triggered by an approval by the user.
- A preset time interval since the last execution of a step or of the method has passed.
- The number of user-specific data elements stored since the last execution of the step of providing a data set, of the step of generating an adapted model or of the method has reached a preset value.

In embodiments, the method may provide various opportunities to the user to influence the execution of the method. For example, one of the following may apply:

- The user may set operational parameters used in the method. For example, the user may choose which AI of a plurality of AI is used, the amount of user-specific data elements that have not been used in generating an adapted model so far, said amount triggering the start of the step of generating an adapted model of the AI, the time interval between automatic or semi-automatic execution of a step.
- An execution of a step may be considered as semi-automatic if the user needs to confirm before the step is carried out automatically.
- The user may be allowed to decide which model he wants to use.
- For example, a list of models used by the user and/or generated at the user so far may be generated and the user may be allowed to define one of these models as the current model for present classifications by the AI.
- The list of models may comprise further information, such as general or category specific classification indicators (e.g. recall or F-value), changes in classification indicators, the history of classification indicators, and/ or examples of images that will be classified differently if the current model is replaced by the adapted model.

An important application of the method for adapting to a specific user a model of an AI for classifying images of a body portion is the improvement of the performance of a system for classifying images of the body portion.

Therefore, the invention concerns further a method for improving the performance of a system for classifying images of a body portion, wherein one the following applies:

The method comprises a step of carrying out the method for adapting (the method for providing a user-specific model, as the case may be) according to any embodiment disclosed.

In this case, the method may be considered as a computer-implemented method.

The method comprises a step of providing an adapted model, wherein the adapted model is generated by the method for adapting (the method for providing a user-specific model, as the case may be) according to any embodiment disclosed.

In particular in this case, it is important to note that any model adapted to a specific user may be of high value, because the adapted model reproduces the knowledge, experience, risk tolerance, philosophy etc. of a specific user that may be a highly skilled expert-user. Therefore, providing a model adapted to a specific user to another user may bring the other user to or at least close to the expertise of the specific user.

The adapted model may be of high value due to further reasons. For example, it may be easier for a medical institution to keep their performance level in case an expert leaves the medical institution. Further, an expert may preserve his expertise and/or transfer it easily to another medical institution or facility.

Even further, models adapted to a specific user may help to identify differences between specific users. This may help to improve the skills of the users further, for example. It may also help to identify desired or undesired behavior, for example too high or too low risk tolerance.

For example, one may envisage to generate models adapted to subgroups of a user, for example to an individual member of a medical institution, and a model adapted to the user, this means representing a plurality of subgroups, in particular all subgroups, this means representing the medical institution.

Due to these reasons, the invention concerns further the model adapted to a specific user by carrying out the method for adapting a model according to any embodiment disclosed.

In particular, the invention concerns a computer-readable medium having stored thereon a model adapted to a specific user by carrying out the method for adapting a model according to any embodiment disclosed or a data carrier signal carrying a model adapted to a specific user by carrying out the method for adapting a model according to any embodiment disclosed.

The invention concerns further the use of the method for adapting a model according to any embodiment disclosed, said use being for generating or providing an adapted model.

Coming back to the method for improving the performance of a system for classifying images of a body portion, in particular to the method comprising the step of carrying out the method for adapting according to any embodiment disclosed, the system comprises, in an embodiment, an analysis unit that is configured to store a model of the AI and to classify a medical image using the AI configured according to the stored model.

According to this embodiment, the current model of the AI is provided to the analysis unit and the step of replacing the current model with the adapted model is a step of replacing the current model in the analysis unit, said step being carried out in an automated manner if an outcome of a step of assessing the classification performance of the adapted model is positive.

The step of assessing the classification performance of the adapted model comprises assessing whether the classification performance of the adapted model is better than the classification performance of the current model in any embodiment disclosed. The step of assessing the classification performance of the adapted model may comprise assessing any further replacement criterion described above or any combination thereof. In particular, said step may comprise the assessment of the first and second criterions in any embodiment disclosed above.

Alternatively to the step of replacing the current model with the adapted model being carried out in an automated manner, the step of replacing, in the analysis unit, the current model with the adapted model may comprise a step of proposing the replacement of the current model with the adapted model to the user in an automated manner. In particular, the step of proposing may be carried out if an outcome of a step of assessing the classification performance of the adapted model is positive. The step of assessing the classification performance of the adapted model may be implemented in any embodiment described above.

In an embodiment and independent of the question whether the method comprises a step of carrying out the method for adapting according to any embodiment disclosed or a step of providing the method for adapting according to any embodiment disclosed, the system comprises the training unit configured to train the AI for classifying images of the body portion. The method may then comprise further a step of providing the data set to the training unit and the step of generating the adapted model may then be carried out by the training unit.

The step of providing the data set to the training unit and/or the step of generating the adapted model may be carried out in an automated manner.

In particular, the step of providing the data set to the training unit and the step of generating the adapted model may be carried out in an automated manner if a preset time interval since the last execution of a step of providing the data set to the training unit has passed, if a number of user-specific data elements stored since the last execution of the step of providing a data set to the training unit has reached a preset value, or if the user and/or the provider of the AI initiates the start of the step of providing the data set to the training unit.

In embodiments, the training unit is configured further to provide a model generated by training the AI to another component of the system.

The other component of the system may be the analysis unit.

The training unit may be configured to provide a model generated by training the AI to the analysis unit via a communication unit, in particular the communication unit described below.

The invention relates further to a system for classifying images of a body portion in dependence on a characteristic of the body portion and using an AI for classifying images of a body portion in dependence on a characteristic of the body portion.

The characteristic of the body portion may be any characteristic disclosed with respect to the methods.

The AI may be any AI disclosed with respect to the methods.

The system may be configured or may have components configured to carry out any step of the method for adapting to a specific user a model of an artificial intelligence for classifying images of a body portion in any embodiment disclosed and/or any step of the method for improving the performance of a system for classifying images of a body portion in any embodiment disclosed.

Likewise, the method for adapting to a specific user a model of an artificial intelligence for classifying images of a body portion in any embodiment disclosed and/or the method for improving the performance of a system for classifying images of a body portion in any embodiment disclosed may comprise any step related to any feature disclosed with respect to the system.

The system according to the invention comprises a communication unit, a training unit and an analysis unit.

The analysis unit may be the analysis unit disclosed with respect to the method for improving the performance of a system for classifying images of a body portion.

In particular, the analysis unit is configured to store a current model of the artificial intelligence for classifying images of a body portion in dependence on a characteristic of the body portion and to classify images of the body portion using the artificial intelligence configured according to the current model.

The communication unit is configured to provide an image of the body portion taken by a user during its (this means the user's) normal work to the user and to receive, for example during the user's normal work, a user input concerning a label indicating the classification (category) of the image provided. The user input may comprise or be a direct input, such as an explicit correction or approval of a proposed label, or an indirect input, such as an implicit correction or approval of a proposed label, for example the user's approval of a report comprising the (corrected, as the case may be) label of the image.

Again, the term "user" has a broad meaning. In particular, the image may be taken by a first person of the "user", that may be a medical institution, and the classification may be done by a second person of the "user".

The communication unit may comprise a user interface, in particular a user interface comprising a screen and input means, for providing the image to the user and for receiving the user input.

The user input may be an approval or correction of a classification of the image, said classification being proposed by the analysis unit using the AI configured according to the current model.

The system, for example the analysis unit or the communication unit, is configured to provide a data set comprising a user-specific data element that comprises the image provided and its label received by the user input, for example approved or corrected by the user. Thereby, the system is configured to generate the user-specific data element, and hence to provide the data set, in an automated manner.

The user-specific data element can be or generated according to any embodiment disclosed with respect to the methods.

The training unit may be the training unit disclosed with respect to the method for improving the performance of a system for classifying images of a body portion or the method for adapting to a specific user a model of an artificial intelligence for classifying images of a body portion.

In particular, the training unit is configured to generate an adapted model of the AI by training the AI on a training data set comprising a user-specific data element of the data set provided by the system.

Usually, the training data set comprises a plurality of user-specific data elements, in particular user-specific data elements that was not used in a training of the AI by which the current model was generated.

The training of the AI and the training data used can be according to any embodiment of the training and the training data used with respect to the methods.

The system, for example the training unit or the analysis unit, is configured further to determine a classification performance of the current model and a classification performance of the adapted model and to replace, in the analysis unit, the current model of the AI with the adapted model of the AI if a replacement criterion is fulfilled, in particular if the classification performance of the adapted model is better than the classification performance of the current model.

The system may be configured to replace, in the analysis unit, the current model of the AI with the adapted model of the AI, via the communication unit, for example in an automated manner or in dependence of a user feedback.

The classification performance of the current model may be any classification performance of the current model disclosed with respect to the methods.

The classification performance of the adapted model may be any classification performance of the adapted model disclosed with respect to the methods.

The system may be configured to assess whether the replacement criterion of a better classification performance of the adapted model with respect to the current model. The system may be configured further to assess whether any further replacement criterion or replacement criterion disclosed with respect to the methods is/are fulfilled.

The place where the components of the system, in particular the communication unit, the training unit and the analysis unit, are arranged, in particular arranged relative to each other, may depend on the concrete embodiment of the system. For example, the components of the system may be arranged as follows:

In an embodiment, the system is a local integral system that comprises the communication unit the training unit and the analysis unit. This means the system is an integral system that comprises the communication unit the training unit and the analysis unit and that is designed for being installed, as a whole, at one place, for example at one place at the user, such as in or at a medical facility of the user, for example a medical imaging system or an image analysis system.

In another embodiment, the system comprises a first system part and a second system part that is arranged remotely to the first system part, wherein the first system part comprises the communication unit and the second system part comprises the training unit, wherein the communication unit is configured to communicate with the second system part.

In other words, the system is not a local integral system but it is spit up in the first system part that is designed for being installed at the user and in the second part that is designed for being installed remotely, for example at the provider of the AI.

According to a first option of the embodiment, the first system part comprises further the analysis unit.

In embodiments according to the first option, the training of the AI and hence the generation of the adapted model is outsourced.

According to a second option of the embodiment, the second system part comprises further the analysis unit.

Embodiments according to the second option are cloud-based embodiments of the system, for example. In particular, every component that is not needed immediately for generating the user-specific data element may be outsourced.

In embodiments, the system for classifying images of a body portion according to a characteristic of the body portion using an artificial intelligence for classifying images of a body portion according to a characteristic of the body portion is configured for at least one of:

Executing the classification of the images.

Supporting the user in making a diagnosis. For example, the system may be configured to propose a diagnosis and/or to recommend a clinical action, to indicate a region of interest in the image etc.

Supporting the user in the user's everyday work, for example by carry out, in an automated manner, steps that are preliminary or subsequent to the step of making a diagnosis.

For example, the system may be configured to at least one of pre-processing the images, compiling information, generating a report or a part thereof etc.

In an embodiment, the system is configured for object localization in the image or image segmentation.

In particular, the system may be configured for identifying the position of features that may be relevant for diagnosis and for classifying said features.

The system may be configured for identifying the position of features that may be relevant for diagnosis and for classifying said features by having implemented a sliding window method for object localization. The sliding window method may comprise the use of an AI, in particular a convolutional neural network, or it may be of a conventional, in particular non-AI based, kind. However, it was found that the classification of the images, in particular the classification based on the AI and models as disclosed with respect to the present invention, is better, in particular with respect to time consumption, if an AI is used for identifying the position of features that may be relevant for diagnosis.

In an embodiment, the system is configured for image segmentation in the meaning that, for a plurality of sub-areas of the image, for example for each pixel of the image, a probability of belonging to a certain category, for example any of the categories mentioned above, and/or of being suspicious is determined.

The system may be configured further to highlight the sub-areas/pixels having a probability of belonging to a given category and/or of being suspicious that is higher than a preset value.

The invention concerns further a computer program comprising instructions which, when the program is executed by a computer, to cause the computer to carry out at least one of the method for adapting to a specific user a model of an AI for classifying images of a body portion (the method for providing a user-specific model, as the case may be) according any embodiment disclosed and the method for improving the performance of a system for classifying images of a body portion according to any embodiment disclosed.

The invention concerns further a computer-readable medium having stored thereon instructions which, when executed by a computer, cause the computer to carry out at least one of the method for adapting to a specific user a model of an AI for classifying images of a body portion (the method for providing a user-specific model, as the case may be) according to any embodiment disclosed and the method for improving the performance of a system for classifying images of a body portion according to any embodiment disclosed.

The invention concerns further a data carrier signal carrying instructions which, when executed by a computer, cause the computer to carry out at least one of the method for adapting to a specific user a model of an AI for classifying images of a body portion (the method for providing a user-specific model, as the case may be) according to any embodiment disclosed and the method for improving the performance of a system for classifying images of a body portion according to any embodiment disclosed.

In particular, the invention concerns any reproducible computer-readable signal encoding the computer program that, when loaded and executed on a computer, causes the computer to carry out at least one of the method for adapting to a specific user a model of an AI for classifying images of a body portion (the method for providing a user-specific model, as the case may be) according to any embodiment disclosed and the method for improving the performance of a system for classifying images of a body portion according to any embodiment disclosed.

The computer that is caused to carry out the method may be a computer or a computer network of the system in any embodiment disclosed.

The invention concerns further a method of manufacturing a non-transitory computer readable medium, comprising the step of storing, on the computer readable medium, computer-executable instructions which when executed by a processor of a computing system, cause the computing system to perform at least one of the method for adapting to a specific user a model of an AI for classifying images of a body portion (the method for providing a user-specific model, as the case may be) according to any embodiment disclosed and the method for improving the performance of a system for classifying images of a body portion according to any embodiment disclosed.

BRIEF DESCRIPTION OF THE DRAWINGS

Exemplarily embodiments of the invention are shown in the following figures. In the figures, the same reference symbol is used for identical or comparable elements. It shows.

DETAILED DESCRIPTION OF THE EMBODIMENTS

Figure 1:
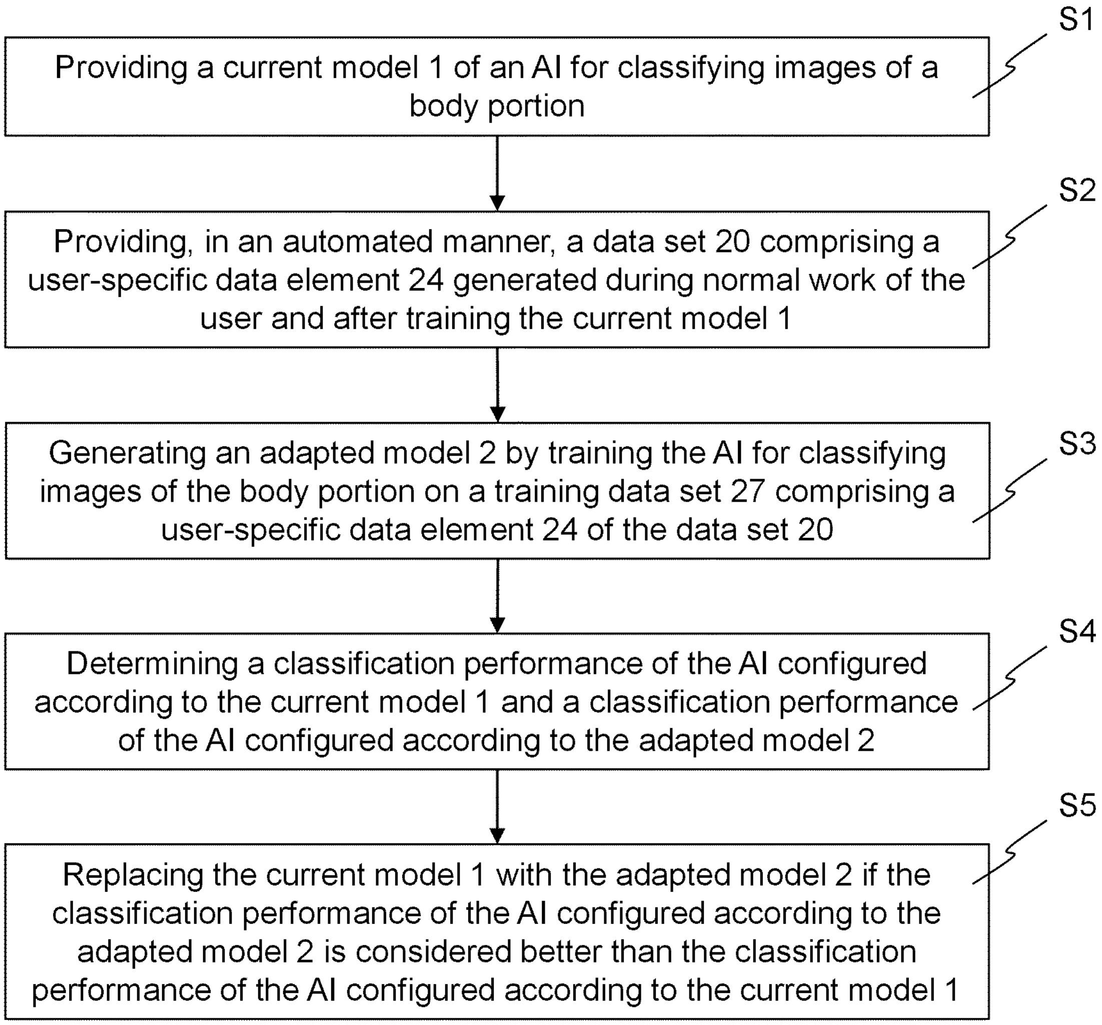
FIG. 1 a flow chart of the basic steps of a method for adapting to a specific user a model of an artificial intelligence for classifying images of a body portion.

FIG. 1 shows a flow chart of the basic steps of a method for adapting to a specific user a model of an artificial intelligence (AI) for classifying images of a body portion in dependence on a characteristic of the body portion shown in the image. The basic steps are shown in an exemplary temporal sequence that is suitable for generating the adapted model and for providing it if the replacement criterion shown in FIG. 1 and discussed below is fulfilled.

The basic steps in their exemplary temporal sequence are:

A step S1 of providing a current model 1 of the AI for classifying images of a body portion.

The current model 1 is provided after training the AI on a given training data set. Usually, it is provided after verifying that the AI configured according to the current model 1 shows a preset classification performance by testing it on a given test data set. For example, it may be verified that the AI configured according to the current model shows a preset accuracy, precision and/or recall.

A step S2 of providing in an automated manner a data set 20 comprising a user-specific data element 24 generated during normal work of the user and after training the current model 1. "During normal work of the user" means also that the equipment used by the user works in its normal, set-up and configured state.

The user-specific data element 24 or each user-specific data element 24 if the data set 20 provided comprises a plurality of user-specific data elements 24 comprises an image 25 of the body portion to be classified and its classification according to the user, this means a label indicating to which category it belongs in the opinion of the user.

As mentioned, the user-specific data element 24 is generated during normal work of the user, this means the image 25 is taken in a normal, everyday workflow at the user and it is classified by the user in a normal, everyday workflow at the user. Also as mentioned, the normal, everyday workflow of the user may not change at all for generating user-specific data elements 24 and for providing the data set 20 comprising user-specific data elements 24. However, there are embodiments in which generating user-specific data elements 24 and providing the data set 20 comprising user-specific data elements 24 influences slightly the user's workflow, for example by a need to classify images having or having probably, according to the user, a wrong classification.

A step S3 of generating an adapted model 2 by training the AI for classifying images of the body portion on a training data set 27 comprising a user-specific data element 24 of the data set 20.

Usually, the training data set 27 comprises a plurality of user-specific data elements 24. The composition of the training data set 27 may be user-specific. This means, it may depend on the number per category of user-specific data elements 24 made by the user, the number per category of diagnoses made by the user, a degree and/or page of adaption wished by the user, for example.

Therefore, the training data set 27 may comprise user-specific data elements 24 only or it may comprise further data elements, for example data elements provided by the provider of the AI and/or of other users.

A step S4 of determining a classification performance of the AI configured according to the current model 1 and a classification performance of the AI configured according to the adapted model 2.

The classification performance may consider any performance indicator used in the field of AI. In particular, it may consider an overall performance indicator, such as accuracy, and a category-specific performance indicator, such as precision.

In particular, the classification performance of the AI configured according to the current model 1 and the classification performance of the AI configured according to the adapted model 2 is determined on a test data set 28 comprising user-specific data elements 24' that have not been used in a training of a model of the AI.

The composition of the test data set 28 may be user-specific as discussed with respect to the training data set 27, for example.

A step S5 of replacing the current model 1 with the adapted model 2 if a replacement criterion is fulfilled. The replacement criterion comprises a better classification performance of the AI configured according to the adapted model 2 than the classification performance of the AI configured according to the current model 1.

As mentioned, the classification performance of the AI configured according to the current model and configured according to the adapted model may be determined on the test data set 28 comprising user-specific data elements 24'. By doing so, it can be made sure that the classification performance by replacing models improves only, in the eye of the user.

Figure 2:
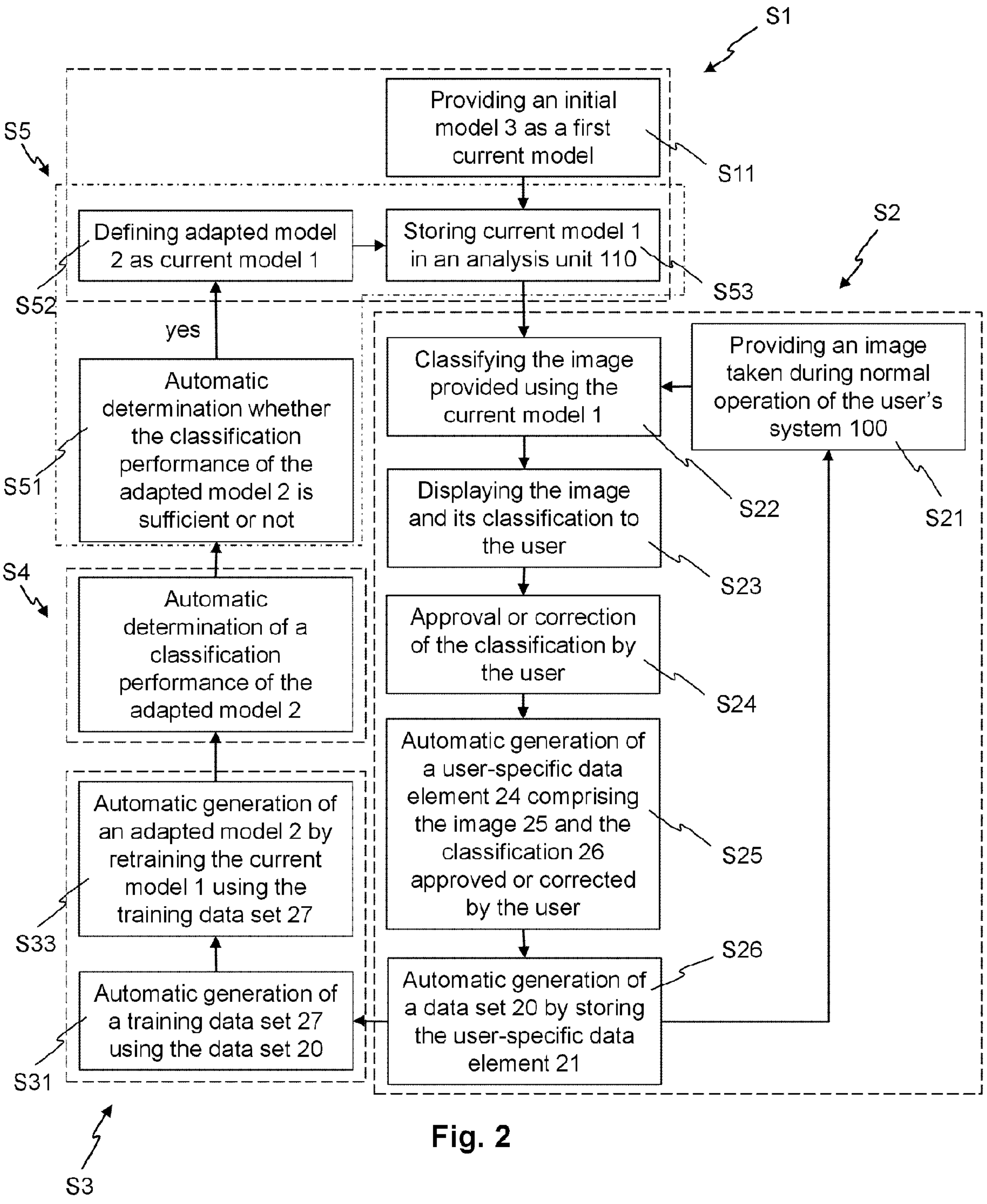
FIG. 2 a flow chart of an exemplary embodiment of the method for adapting to a specific user a model of an artificial intelligence for classifying images of a body portion.

FIG. 2 shows a detailed flow chart of an exemplary embodiment of the method for adapting to a specific user a model of an artificial intelligence for classifying images of a body portion.

The basic steps S1-S5 disclosed with respect to FIG. 1 are indicated in FIG. 2 by dashed boxes (steps S1-S4) and dashed-dotted boxes (step S5).

According to the embodiment shown in FIG. 2, the step S1 of providing a current model 1 comprises a step S11 of providing an initial model 3 as a first current model in case the method has not executed at the user yet. If the method has executed at the user yet, the step S1 of providing a current model 1 comprises, instead of the step S11 of providing an initial model 3, a step S52 of defining (setting) the adapted model 2 that has been generated during execution of the method as current model if the replacement criterion is fulfilled or a step of confirming (not shown in FIG. 2) the current model 1 if the replacement criterion is not fulfilled.

If the step S1 of providing a current model 1 comprises the step S11 of providing an initial model 3 or the step S52 of defining the adapted model 2 as current model, the step S1 of providing a current model 1 comprises further a step S53 of storing the initial model 3 or the adapted model 2 defined as current model, in particular storing the initial model 3 or the adapted model 2 defined as current model in an analysis unit 110.

If the step S1 of providing a current model 1 comprises the step of confirming the current model 1, no manipulation at stored model is needed. However, information related to the confirmation of the current model 1 may be stored.

The analysis unit 110 is a component of a system 100 related to the method. The system 100 and the analysis unit 110 are discussed below. However, the analysis unit 110 is configured to store the current model 1 and to classify an input image using the AI configured according to the stored current model 1.

According to the embodiment shown in FIG. 2, the step S2 of providing in an automated manner, a data set 20 comprising a user-specific data element 24 comprises the following steps:

A step S21 of providing an image taken during normal operation of the user's system 100, this means during normal, everyday work of the user.

The image can be taken by any medical imaging system suitable for showing the characteristic according to which the image, and hence the body portion shown thereon, can be classified.

In many embodiments, the image is a radiologic image.

In an important application, the characteristic according to which the image is classified is the mammographic density (MD), also called breast density, this means the relative amount of fibroglandular breast tissue and fat tissue in the breast. Then, the categories into which the radiologic image showing a breast is classifies may be the categories according to ACR BI-RADS, for example as updated in November 2015.

A step S22 of classifying the image provided using the current model 1, this means the AI configured according to the current model.

In other words, the provided image is the input to the AI configured according the current model 1 and a classification, this means a label indicating the category to which the body portion shown in the image belongs according to the AI, is the output of the AI.

The provided image may be pre-processed before being inputted to the AI. For example, the image and/or its settings may be standardized, for example the image may be resized, the body portion shown may be rearranged etc.

A step S23 of displaying the image and the classification according to the AI configured according to current model 1, to the user.

The image and the classification according to the AI may be displaced to the user via the user interface 140, for example a screen of the medical imaging system or a screen of computer belonging to the same computer network as the medical imaging system.

The image and the classification according to the AI may be displayed to the user via a communication unit 130 that is connected to the analysis unit 110 and the user interface 140.

The communication unit 110 is a further component of the system 100 related to the method. The communication unit 110 is discussed further below.

A step S24 of approving or correcting, by the user, the classification according to the AI configured according to the current model 1.

As mentioned, the step S24 of approving or correcting may be a step integrated in the normal, everyday workflow of the user. In particular, it may be an approval or correction made by user when assessing the image supported by a CAD device.

A step S25 of automatic generation of the user-specific data element 24 comprising the image 25 and the classification 26 approved or corrected by the user.

In particular, a user-specific data element 24 is generated without further action of the user whenever the user approves or corrects a classification according to the AI.

The user-specific data element 24 may comprise further information, such as the date the image was taken, patient-specific information, such as its age, gender, weight etc., the date the classification was approved or corrected, an indicator whether the classification according to the AI was approved or corrected by the user, the name of the person having approved or corrected the classification according to the AI etc.

A step S26 of automatic generation of the data set 20 by storing the user-specific data element 21.

The data set 20 may comprise a sub-sets or it may allow for the generation of sub-sets, for example sub-sets according to any of the further information mentioned above.

Usually, a plurality of user-specific data elements 24 is generated and stored in the above-summarized manner. According to the embodiment shown in FIG. 2, this is done by providing S21 and classifying S22 on taken image after the other, by displaying S23 and approving or correcting S25 the image and its classification according to the AI, by generating automatically one user-specific data element 24 after the other, and by storing one generated user-specific data element 24 after the other. This consecutive sequence of steps is indicated in FIG. 2 by the arrow pointing from the step S26 of generating automatically a data set 20 by storing the user-specific data element 21 to the step S21 of providing an image taken during normal operation of the user's system 100.

According to the embodiment shown in FIG. 2, the step S3 of generating an adapted model 2 by training the AI for classifying images of the body portion on a training data set 27 comprising a user-specific data element 24 of the data set 20 comprises a step S31 of automatic generation of a training data set 27 using the data set 20.

In other words, a training data set 27 is generated in an automated manner, said training data set 27 comprises user-specific data elements 21 stored in the data set 20 that has been generated previously.

Figure 4:
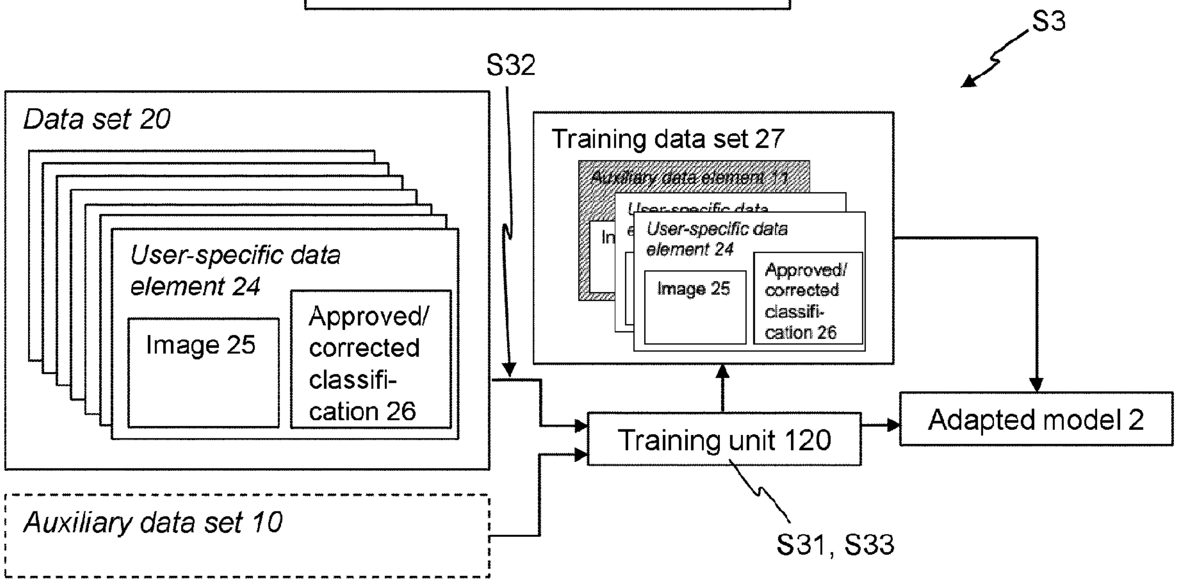

The training data set 27 may be composed as disclosed with respect to FIG. 1 and/or FIG. 4.

According to the embodiment shown in FIG. 2, the step S3 of generating an adapted model 2 comprises further a step S33 of automatic generation of the adapted model 2 by retraining the current model 1 using the training data set 27 generated.

In other words, the AI configured according to the current model 1 is used as starting point of the training on the training data set 27 for the generation of the adapted model.

Figure 5A:
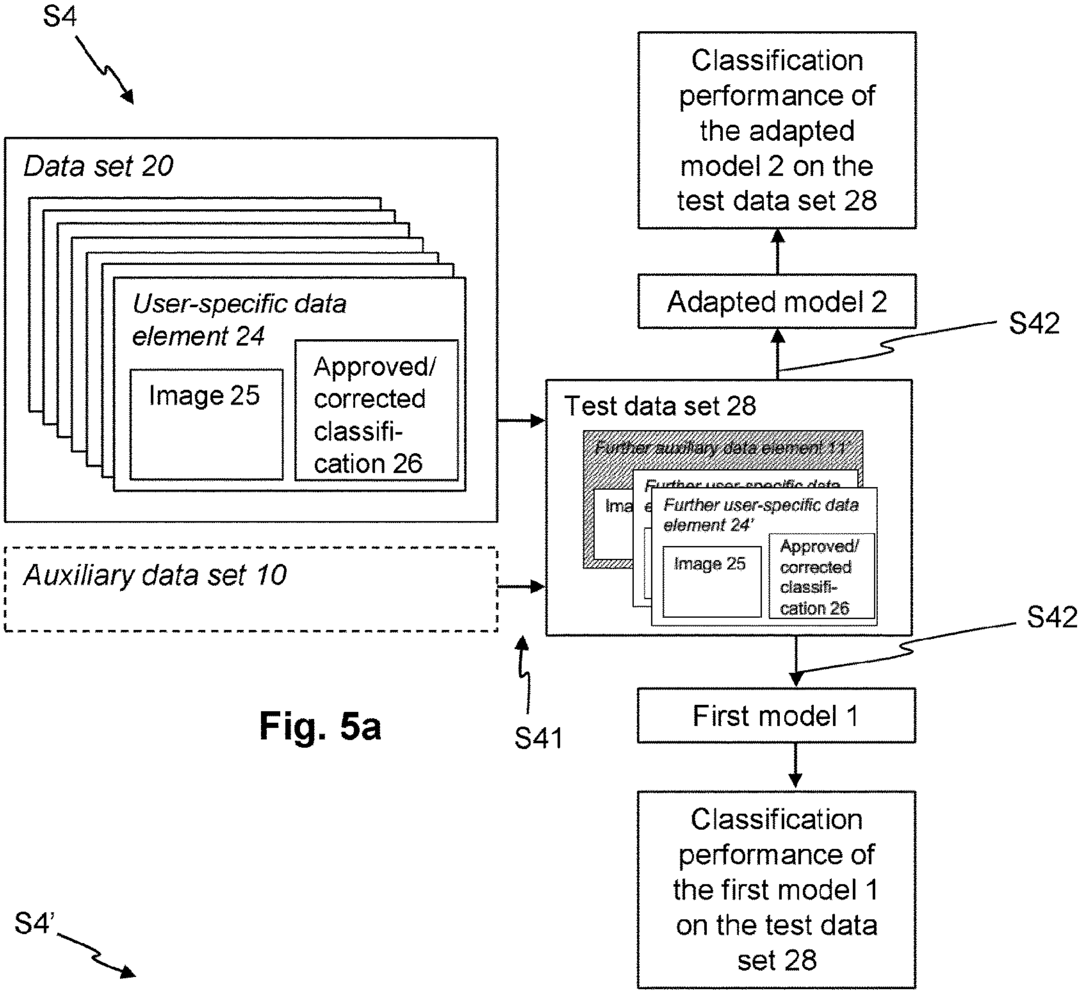
Figure 5B:
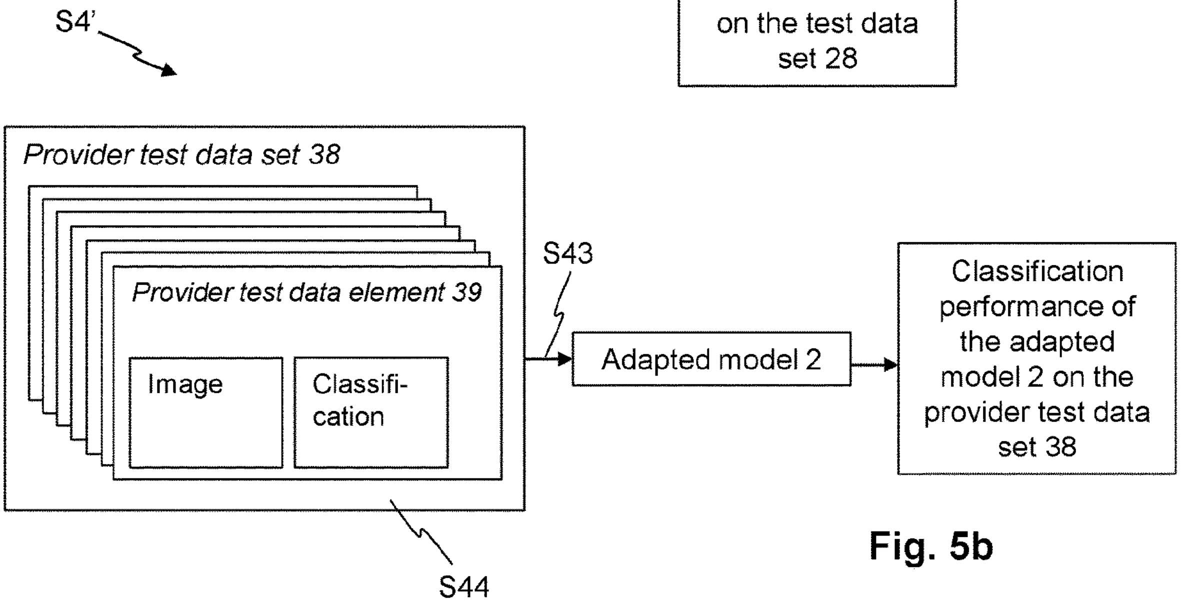

The basic step S4 of determining a classification performance of the AI configured according to the current model 1 and a classification performance of the AI configured according to the adapted model 2 is as disclosed with respect to FIG. 1 and/or FIGS. 5*a*-5*b*. In particular, the step S4 of determining the classification performances of the AI configured according to the current model 1 and according to the adapted model 2 may comprise at least one of:

A step S41 of generating the test data set 28 and a step S42 of testing the AI configured according to the current model and the AI configured according to the adapted model on the test data set 28 generated.

The test data set 28 may be as disclosed with respect to FIG. 1 and/or FIG. 5*a*.

A step of testing the AI configured according to the adapted model on a provider test data set 38.

The provider test data set may be a static test data set, in particular the test data set used for testing the AI configured according to the initial model 3.

The provider test data set is provided by the provider of the AI or a person or institution different from the (specific) user. Therefore, the provider test data set does not comprise user-specific data elements 24.

Optionally, the AI configured according to the current model 1 may also be tested on the provider test data set 38. This allows for a comparison of the classification performances based on the provider test data set 38.

Figure 6:
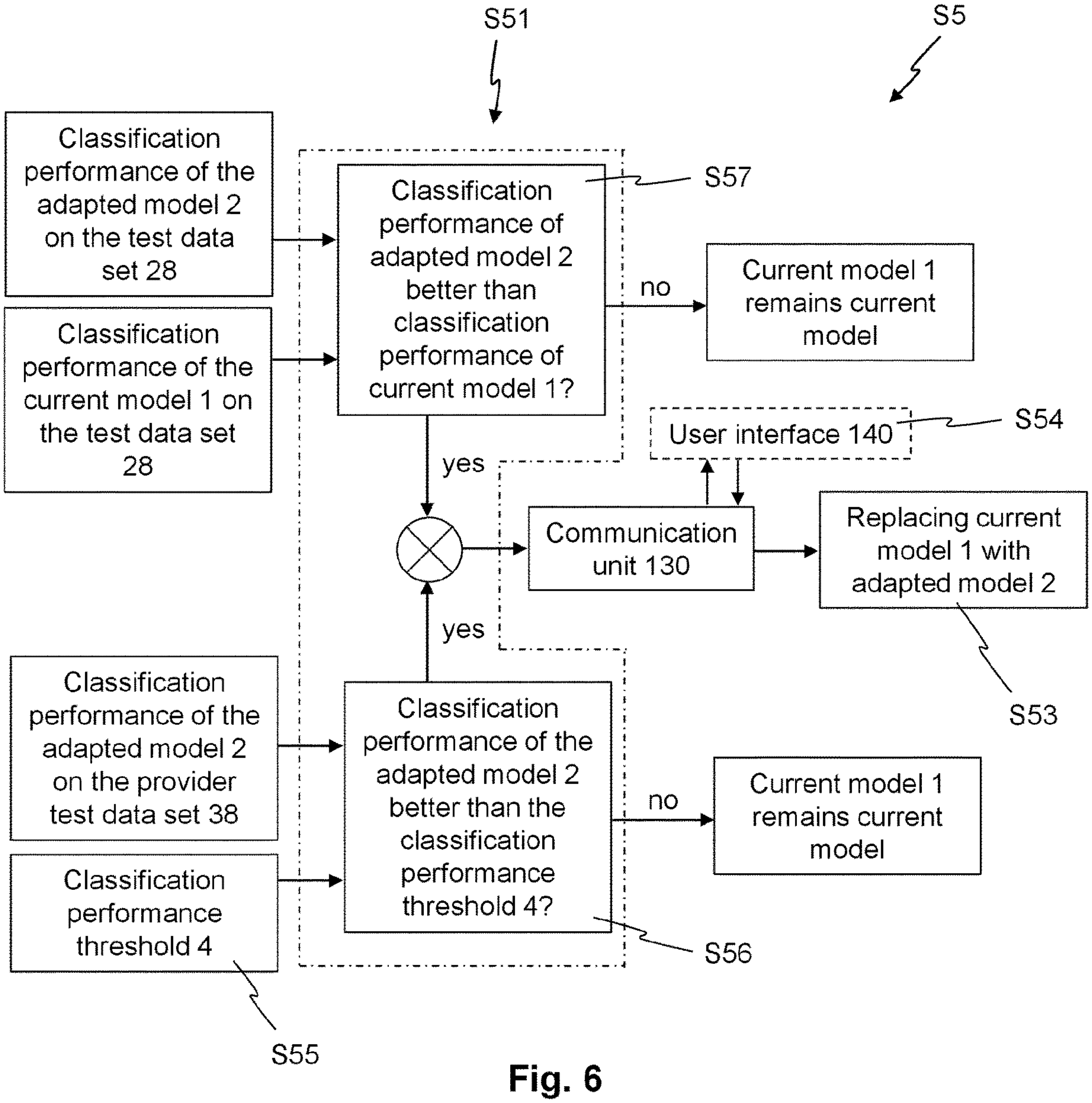

However, a comparison to a classification performance threshold 4 of the AI configured according to the adapted model and tested on the provider test data set 38, as shown in FIG. 6, may be favorable compared to a comparison of the classification performances.

According to the embodiment shown in FIG. 2, the step S5 of replacing the current model 1 with the adapted model 2 if a replacement criterion is fulfilled comprises a step S51 of automatic determination whether the classification performance of the AI configured according to the adapted model 2 is sufficient or not.

In particular, the classification performance of the AI configured according to the adapted model 2 is configured as sufficient if its classification performance on the test data set 28 is better than the classification performance of the AI configured according to the current model on the test data set 28.

In embodiments, there may be one or more further replacement criterion, for example the replacement criterion mentioned before and shown in FIG. 6 in detail, namely a classification performance of the AI configured according to the adapted model 2 on the provider test data set 38 that is better than the classification performance threshold 4.

The step S5 of replacing the current model 1 with the adapted model 2 comprises further, in the embodiment shown, the step S52 of defining the adapted model 2 as current model or the step of confirming (not shown in FIG. 2) the current model 1 as current model, as discussed above.

Finally, the step S5 of replacing the current model 1 with the adapted model 2 comprises further, in the embodiment shown, the step S53 of storing the adapted model 2, and hence replacing the current model 1, if the adapted model has been defined as the "new" current model, as discussed above.

In many embodiments, the basic steps S1-S5, for example as disclosed in FIGS. 1 and 2, are carried out consecutively a plurality of times. This is indicated in FIG. 2 by closed loop of steps. Thereby the starting point may be considered as the step S31 of automatic generation of the training data set 27, wherein the start may be triggered by a preset number of new user-specific data elements or by a time interval, for example.

Figure 3:
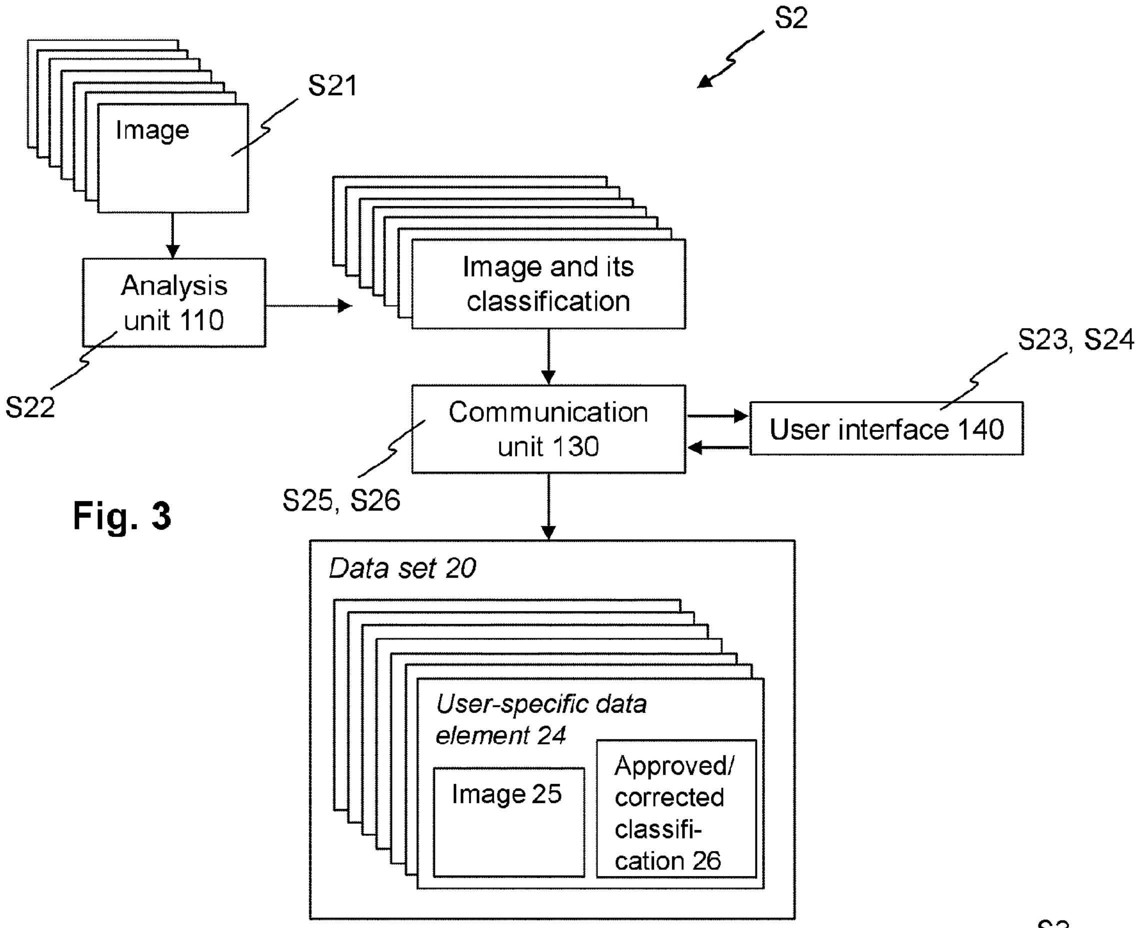
FIGS. 3-6 flow charts of detailed exemplary embodiments of the basic steps of the method according to FIGS. 1 and 2.

FIG. 3 shows a detailed flow chart of an exemplary embodiment of the step S2 of providing in an automated manner a data set 20 comprising a user-specific data element 24, for example as disclosed with respect to FIG. 1 or 2.

According to the embodiment shown, images are provided, for example via the communication unit 130, to the analysis unit 110 where the AI configured according to the current model 1 classifies the images, this means the step S22 of classifying the image using the AI configured according to the current model 1 is carried out.

The communication unit 130 displays the images and their classification according to the AI (step S23 of displaying the image and the classification) to a user and receives a user input comprising an approval or correction of the classifications of the images displayed (step 24 of approving or correcting).

The communication unit, or another component of the system 100, for example the analysis unit 110 or a training unit 120, generates then user-specific data elements from the images and their classifications 26 approved or corrected in an automated manner (step S25 of automatic generation of the user-specific data element 24) and generates or updates the data 20 comprising user-specific data elements 24.

FIG. 4 shows a detailed flow chart of an exemplary embodiment of the step S3 of generating an adapted model 2, for example as disclosed with respect to FIG. 1 or 2.

According to the embodiment shown in FIG. 4, the step S3 of generating an adapted model 2 comprises a step S32 of providing the generated data set 20 and optionally an auxiliary data set 10 to the training unit or any other component of the system configured to carry out the step S31 of automatic generation of a training data set 27 using the data set 20.

The auxiliary data set may comprise auxiliary data elements provided by the provider of the AI or another user.

One may also envisage to provide the "new" user-specific data elements 24, this means user-specific data elements 24 that have not been used in any training or testing of the AI, of the data set 20 to the training unit or the component of the system configured to carry out the step S31 of automatic generation of a training data set 27 using the data set 20 only and to store and optionally provide the "old" user-specific data elements 24, this means user-specific data elements 24 that have been used in any training or testing of the AI yet, in the auxiliary data set.

In other words, the auxiliary data set may comprise at least one of data elements provided by at least one of the provider of the AI, data elements provided by another user, and "old" user-specific data elements 24.

Finally, the AI is trained in the training unit 120 on the training data set 27, wherein the output of the training is the adapted model 2 (step S33 of automatic generation of the adapted model 2).

FIG. 5*a* shows a detailed flow chart of an exemplary embodiment of the step S4 of determining a classification performance of the AI configured according to the current model 1 and a classification performance of the AI configured according to the adapted model 2, for example as disclosed with respect to FIG. 1 or 2.

According to the embodiment shown in FIG. 5*a*, the step S4 of determining said classification performances comprises a step S41 of generating the test data set 28 mentioned with respect to FIG. 2. According to the embodiment shown in FIG. 5*a*, the test data set 28 is generated using the data set 20 comprising user-specific data elements and optionally by using the auxiliary data set 10.

However—and according to good practice in assessing the performance of an AI—the test data set 28 does not comprise any user-specific data element and any auxiliary data element 11 used in any training of the AI.

User-specific data elements not used in any training of the AU are called further user-specific data elements 24' and auxiliary data elements not used in any training of the AI are called further auxiliary data elements 11' in this text. Hence, the test data set 28 generated comprises further user-specific data elements 24' and optionally further auxiliary data elements 11'.

According to the embodiment shown in FIG. 5*a*, both the AI configured according to the adapted model 2 and the AI configured according to the current model 1 are tested on test data set 28 generated.

In other words, the step S4 of determining a classification performance of the AI configured according to the current model 1 and a classification performance of the AI configured according to the adapted model 2 comprises the step S42 of testing the AI configured according to the current model and the AI configured according to the adapted model on the test data set 28 generated. The step S42 of testing the AI in said configurations has been mentioned with respect to FIG. 2, already.

The outcome of the step S42 of testing the AI configured according to the current model and the AI configured according to the adapted model on the test data set 28 generated is a classification performance of the adapted model 2 on the test data set 28 and a classification performance of the current model 1 on the test data set 28, in the embodiment disclosed in FIG. 5*a*.

FIG. 5*b* shows a detailed flow chart of an alternative step S4' of determining a classification performance, wherein it is a classification performance of the AI configured according to the adapted model 2 that is determined in said alternative step S4'. The alternative step S4' has been disclosed with respect to FIGS. 1 and 2 and it may be as disclosed with respect to FIG. 1 or 2, for example.

According to the embodiment shown in FIG. 5*b*, the alternative step S4' of determining a classification performance comprises a step S44 of providing a provider test data set 38.

The provider test data set 38 may be as disclosed with respect to FIG. 2.

According to the embodiment shown in FIG. 5*b*, the alternative step S4' of determining a classification performance comprises a step S43 of determining a classification performance of the AI configured according to the adapted model 2 on the provider test data set 38. In other words, the AI configured according to the adapted model 2 is tested on the provider test data set 38.

The outcome of the step S43 of determining a classification performance of the AI configured according to the adapted model 2 on the provider test data set 38 is a classification performance of the AI configured according to the adapted model 2 on the provider test data set 38.

As mentioned with respect to FIG. 2, the alternative step S4' of determining a classification performance may comprise further determining a classification performance of the AI configured according to the current model 1 on the provider test data set 38. The classification performance of the AI configured according to the current model 1 may be determined after the training of the AI that led to the current model 1, this means in a previous execution of the basic steps S1-S5 as shown in FIGS. 1 and 2 or before providing the initial model 3 to the user.

Alternatively or in addition, the classification performance of the AI configured according to the adapted model 2 may be assessed with respect to a classification performance threshold 4, as shown in FIG. 6. In this case, there may be no need for determining or providing the classification performance of the AI configured according to the current model 1 on the provider test data set 38.

Classification performances, as disclosed exemplarily with respect to FIGS. 5*a* and 5*b* for example, are the basis for the step S5 of replacing the current model 1 with the adapted model 2 because the assessment whether the replacement criterion or replacement criterions are fulfilled bases on the classification performance or classification performances determined.

FIG. 6 shows a detailed flow chart of an exemplary embodiment of the step S5 of replacing the current model 1 with the adapted model 2 if a replacement criterion is fulfilled, for example as disclosed with respect to FIG. 1 or 2.

According to the embodiment shown in FIG. 6, two replacement criterions need to be fulfilled for the replacement of the current model 1 with the adapted model 2 taking place:

A first criterion is a better performance, on the test data set 28 comprising further user-specific data elements 24', of the AI configured according to the adapted model 2 than the AI configured according to the current model 1.

In other words, the classification performance on the test data set 28 comprising further user-specific data elements 24' determined for the AI configured according to the adapted model 2 needs to be better than the corresponding classification performance of the AI configured according to the current model 1.

Therefore, the step S5 of replacing the current model 1 with the adapted model 2, more precisely the step S51 of automatic determination whether the classification performance of the AI configured according to the adapted model 2 is sufficient or not, comprises a step S57 of comparing the classification performance of the AI configured according to the adapted model 2 with the classification performance of the AI configured according to the current model 1.

If the outcome of the comparison of said classification performances is negative, this means the classification performance of the AI configured according to the adapted model 2 is worse than the classification performance of the AI configured according to the current model 1, there will be no replacement of the current model 1. This means that the current model 1 remains the current model if the outcome of said comparison is negative.

A second criterion is a better performance of the AI configured according to the adapted model 2 on the provider data set 38 than the preset, fixed ("static") classification performance threshold 4.

In other words, the classification performance on the provider test data set 38 determined for the AI configured according to the adapted model 2 needs to be better than the classification performance threshold 4.

Therefore, the step S5 of replacing the current model 1 with the adapted model 2, more precisely the step S51 of automatic determination whether the classification performance of the AI configured according to the adapted model 2 is sufficient or not, comprises a step S55 of providing a classification performance threshold 4 and a step S56 of comparing the classification performance of the AI configured according to the adapted model 2 with the classification performance threshold 4.

If the outcome of the comparison of said classification performance and the classification performance threshold 4 is negative, this means the classification performance of the AI configured according to the adapted model 2 is worse than the classification performance threshold 4, there will be no replacement of the current model 1. This means that the current model 1 remains the current model if the outcome of said comparison is negative.

In other words, the current model 1 is replaced with the adapted model 2 in the step S5 of replacing the current model 1 with the adapted model 2 only if both, the first and the second, replacement criterions are fulfilled, in the embodiment shown in FIG. 6.

If both replacement criterions are fulfilled, the component of the system carrying out the step S51 of determining whether the classification performance of the AI configured according to the adapted model 2 is sufficient or not provides a signal indicating the fulfillment of the replacement criterions to the communication unit 130.

In the embodiment shown in FIG. 6, the communication unit 130 proposes the replacement of the current model 1 with the adapted model to the user via the user interface 140. In other words, the step S5 of replacing the current model 1 with the adapted model 2 comprises the optional step 54 of proposing the replacement of the current model 1 with the adapted model 2 to the user.

Further information may be given to the user in the step S54 of proposing the replacement of the current model 1 with the adapted model 2 to the user. The classification performances determined for the AI configured according to the adapted model 2, changes in classification performances, the history of classification performances, and examples of images that will be classified differently if the current model is replaced by the adapted model are examples of further information that may be given to the user.

If the user approves the replacement of the current model 1 with the adapted model 2, the current model will be replaced in the analysis unit 110 with the adapted model 2 and the adapted model 2 becomes the current model 1 for future classifications of images using the AI.

Figure 7:
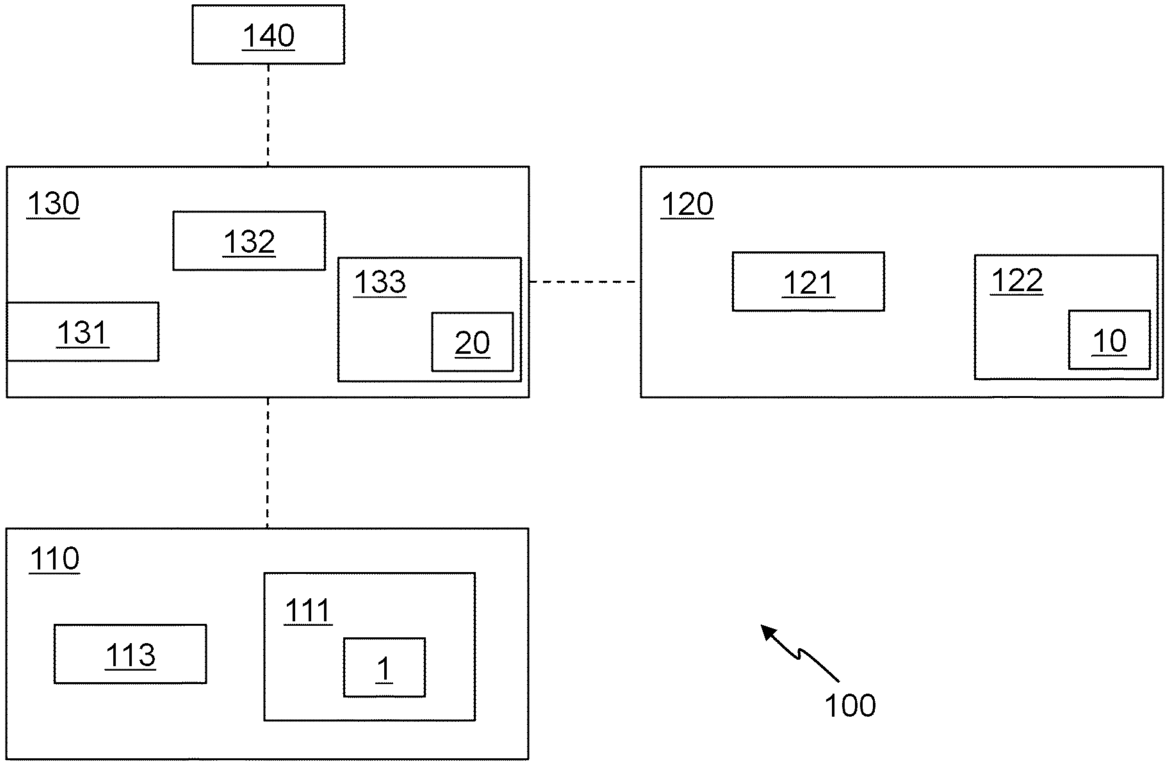
FIG. 7 a schematic view of an exemplary system that is configured to carry out a method for adapting to a specific user a model of an artificial intelligence for classifying images of a body portion.

FIG. 7 shows a schematic view of an exemplary system 100 that is configured to carry out a method for adapting to a specific user a model of an artificial intelligence for classifying images of a body portion.

The system 100 comprises the analysis unit 110, the training unit 120 and the communication unit 130 mentioned before.

The analysis unit 110, the training unit 120 and the communication unit 130 are shown as separate components in the embodiment of FIG. 7. However, this is not mandatory. The analysis unit 110, the training unit 120 and the communication unit 130 may be realized in or on a component of the system. In particular, the system may be a local integral system as disclosed above.

Alternatively, the system may comprise a first system part and a second system part that is arranged remotely to the first system part in any embodiment disclosed above.

In the following, components of the system 100 are specified often by steps they may execute. It goes without saying that this means also that the components are configured to execute said steps.

In the following, the steps the components execute are not discussed in detail anymore. It goes without saying that said steps may be according to any embodiment disclosed so far, in particular according to any embodiment disclosed with respect to FIGS. 1-6.

It is assumed in the following that the data set 20 comprising user-specific data elements 24 is stored in the communication unit 130, that the training data set 27 comprising user-specific data elements 24 and the test data set 28 comprising further user-specific data elements 24' are generated in the training unit 120, that any classification performance is determined in the training unit 120, and that any determination whether the classification performance of the AI configured according to the adapted model 2 is sufficient or not is determined in the training unit 120. However, the various steps and substeps of the method may be distributed to the analysis unit 110, the training unit 120 and the communication unit 130 in a different manner. This means that the features of the components discussed in the following may be attributed to the components in a different manner in dependence on the component that fulfills or contributes to a given step of substep of the method.

In the embodiment shown in FIG. 7, the communication unit 130 comprises the following components for being configured to contribute to carrying out the method:

- A port 131 via with the communication device 130 can be connected to the medical imaging system of the user with which the images are taken.
- Alternatively, the port 131 can be connected to a database, for example PACS image archive, in which the images taken by the user are stored.
- P The connection to the medical imaging system or the database may be a wired or wireless connection.
- A memory 133 for storing, in particular buffering, the images to be analyzed by the user for diagnostic purposes and to be classified by the AI configured according to the current model in the analysis unit, the classifications of the images according to the AI, the classification 26 approved or corrected by the user, and the data set 20 comprising user-specific data elements 24.
- Communication means (indicated by the dotted lines) for data exchange with the analysis unit 110, the training unit 120, and the user interface 140.
- A controller 132 that controls the communication unit. In particular, the controller 132 executes the following:
  - It initiates the classification of the images to be classified by the AI.
  - It initiates displaying of the images and the classifications according to the AI to the user.
  - It generates user-specific data elements 24 and initiates storing them in the user-specific data set 20.
  - It initiates training of the AI in the training unit 110.
  - It provides the user-specific data set 20 to the training unit 110.
  - Optionally, it provides or forwards the current model 1 or information that help to identify the current model to the training unit 130.
  - Optionally, it requests an approval for the replacement of the current model 1 with the adapted model 2.
  - It initiates the replacement of the current model 1 with the adapted model 2 in the analysis unit 120 if the replacement criterion or replacement criterions are fulfilled and if the communication unit 130 received the optional approval by the user. Therefore, the communication unit 130 provides or forwards the adapted model 2 to the analysis unit 120 if In the embodiment shown in FIG. 7, the analysis unit 110 comprises the following components for being configured to contribute to carrying out the method:

- A memory 111 for storing the current model 1 and the AI, this means the algorithm defining the AI.
- Communication means (indicated by the dotted line) for data exchange with the communication unit 130.
- A controller 113 that controls the analysis unit 110. In particular, the controller 113 executes the following:
  - The classification of the images provided by the communication unit 130, wherein the classification is carried out using the AI configured according to the current model 1 stored in the memory 111.
  - Providing the classifications according to the AI to the communication unit 130.
  - Optionally, providing the current model 1 or information that help to identify the current model 1 to the communication unit 130.

In the embodiment shown in FIG. 7, the training unit 120 comprises the following components for being configured to contribute to carrying out the method:

- A memory 122 for storing the training data set 27 comprising user-specific data elements 24, the test data set 28 comprising further user-specific data elements 24', the AI, this means the algorithm defining the AI, optionally at least one model of the algorithm, for example the current model 1, optionally the auxiliary data set 10, optionally the provider test data set 38, and optionally the classification performance threshold 4.

Communication means (indicated by the dotted line) for data exchange with the communication unit 130.

A controller 121 that controls the training unit 110. In particular, the controller 121 executes the following:

Generation of the training data set 27 comprising user-specific data elements 24.

Generation of the test data set 28 comprising further user-specific data elements 24'.

Training the AI stored in the memory 122 on the training data set 27 generated by the controller 121 and stored in the memory 122.

Determination of classification performances. Thereby, the test data set 28 comprising further user-specific data elements 24' stored in the memory 122, the provider test data set 38 stored in the memory 122, and/or the classification performance threshold 4 stored in the memory 122 may be used.

Assessing the classification performance of the AI configured according to the adapted model 2, this means determining whether the replacement criterion or replacement criterions are fulfilled.

Providing the outcome of assessing the classification performance of the AI configured according to the adapted model 2 to the communication unit 130.

Providing the adapted model 2 to the communication unit 130.

In embodiments, the adapted model 2 is provided to the communication unit 130 only if the outcome of assessing the classification performance of the AI configured according to the adapted model 2 is positive.

The controller, in particular the controller used for the training of the AI, may be a graphics processing unit (GPU).

The invention claimed is:

1. A computer-implemented method for adapting to a specific user a model of an artificial intelligence for classifying images of a body portion according to a characteristic of the body portion, the method comprising the steps of:

Providing a current model of the artificial intelligence;

Providing a data set comprising at least one user-specific data element;

Generating an adapted model of the artificial intelligence, wherein the adapted model is generated by training the artificial intelligence on a training data set, wherein the training data set comprises a user-specific data element of the provided data set;

Determining a classification performance of the current model and a classification performance of the adapted model;

Replacing the current model of the artificial intelligence with the adapted model of the artificial intelligence if the classification performance of the adapted model is better than the classification performance of the current model;

wherein the user-specific data element comprises an image of the body portion taken and classified by the user, wherein the user-specific data element is generated in an automated manner, wherein the image of the body portion taken by the user and comprised in the user-specific data element is classified by the user in a step of classifying, wherein the step of classifying comprises or consists of at least one of approving, in a direct or indirect manner, a proposed classification of the image and correcting, in a direct or indirect manner, a proposed classification of the image, and wherein an automatic generation of the training data set and the adapted model is triggered by a preset number of new user-specific data elements or by a preset time interval.

2. The computer-implemented method according to claim 1, wherein the data set provided in the step of providing a data set comprises a plurality of user-specific data elements, wherein the method comprises a step of generating a test data set, wherein the test data set comprises a further user-specific data element of the data set, wherein the further user-specific data element is not present in the training data set, wherein the step of determining a classification performance of the current model and a classification performance of the adapted model comprises testing the current and adapted models on the test data set.

3. The computer-implemented method according to claim 1, comprising a step of providing an initial model of the artificial intelligence, wherein the initial model is tested on a provider test data set, wherein the method comprises a step of providing a classification performance threshold and a step of determining a classification performance of the adapted model on the provider test data set by testing the adapted model on the provider test data set, wherein the better classification performance of the adapted model than the classification performance of the current model is a first criterion in the step of replacing the current model with the adapted model and wherein a classification performance of the adapted model on the provider test data set that is higher than the classification performance threshold is a second criterion in the step of replacing the current model with the adapted model.

4. The computer-implemented method according to claim 1, wherein the step of providing a data set comprises the substeps of:

Classifying, using the current model of the artificial intelligence, the image taken by the user;

Approving or correcting, by the user, the classification of the image determined using the current model of the artificial intelligence, wherein the image is labeled with a corrected classification determined by the user in case of correction of the classification determined using the current model.

5. The computer-implemented method according to claim 1, wherein the step of generating an adapted model and the step of determining a classification performance are carried out in an automated manner.

6. The computer-implemented method according to claim 1, wherein the method is carried out several times, wherein the following applies in a first and second execution of two consecutive executions of the method:

The current model of the artificial intelligence that is provided in the second execution of the method is the model of the artificial intelligence that remains after the step of replacing carried out in the first execution of the method;

At least one user-specific data element that is generated subsequent to the step of providing a data set carried out in the first execution of the method is considered in the step of generating an adapted model carried out in the second execution of the method.

7. The computer-implemented method according to claim 1, wherein the image is taken during the user's routine work and after generating the current model, and in that the user-specific data element is generated in an automated manner.

8. The computer-implemented method according to claim 1, wherein the user-specific data element is generated in an automated manner such that the user is not aware of the generation of the user-specific data element and the data set that is provided.

9. The computer-implemented method according to claim 1, wherein the user-specific data element comprises information such as a date the classification was approved or corrected, an indicator whether the proposed classification was approved or corrected by the user, or a name of the person having approved or corrected the proposed classification.

10. The computer-implemented method according to claim 9, wherein the user-specific data element is generated without further action of the user whenever the user approves or corrects the proposed classification.

11. The computer-implemented method according to claim 1, wherein the user-specific data element is generated without further action of the user whenever the user approves or corrects the proposed classification.

12. A method for improving the performance of a system for classifying images of a body portion, the method comprises a step of carrying out a method for adapting a model according to claim 1 or a step of providing an adapted model, wherein the adapted model is generated by a method for adapting a model according to claim 1.

13. The method according to claim 12, wherein the current model is provided in an analysis unit of the system, and wherein the step of replacing the current model with the adapted model is a step of replacing the current model in the analysis unit that is carried out in an automated manner if an outcome of a step of assessing the classification performance of the adapted model is positive; or the step of replacing, in the analysis unit, the current model with the adapted model comprises a step of proposing the replacement of the current model with the adapted model to the user in an automated manner if an outcome of a step of assessing the classification performance of the adapted model is positive.

14. The method according to claim 13, comprising a step of providing the data set to a training unit configured to train the artificial intelligence for classifying images of the body portion, wherein the step of generating an adapted model is carried out by the training unit.

15. A system for classifying images of a body portion according to a characteristic of the body portion using an artificial intelligence for classifying images of a body portion according to a characteristic of the body portion, the system comprises a communication unit, at least one processor, and at least one memory, the processor and/or the memory configured to realize a training unit, and an analysis unit, wherein the analysis unit is configured to store a current model of the artificial intelligence and to classify images of the body portion using the artificial intelligence configured according to the current model, wherein the system is configured to provide a data set comprising a user-specific data element, wherein the training unit is configured to generate an adapted model of the artificial intelligence by training the artificial intelligence on a training data set comprising a user-specific data element of the data set provided by the system, wherein the system is configured to determine a classification performance of the current model and a classification performance of the adapted model and to replace, in the analysis unit, the current model of the artificial intelligence with the adapted model of the artificial intelligence if the classification performance of the adapted model is better than the classification performance of the current model, wherein the communication unit is configured to provide an image of the body portion taken by a user during the user's routine work to the user and to receive a user input concerning a label indicating the classification of the image provided, wherein the user-specific data element comprises the image provided and its label received by the user input, wherein the system is configured to generate the user-specific data element in an automated manner, wherein the user input comprises or consists of at least one of approving, in a direct or indirect manner, a proposed classification of the image and correcting, in a direct or indirect manner, a proposed classification of the image, and wherein the system is configured for an automatic generation of the training data set and the adapted model triggered by a preset number of new user-specific data elements or by a preset time interval.

16. The system according to claim 15, wherein the system is a local integral system comprising the communication unit, the training unit and the analysis unit, or wherein the system comprises a first system part and a second system part that is arranged remotely to the first system part, wherein the first system part comprises the communication unit and the second system part comprises the training unit, wherein the communication unit is configured to communicate with the second system part.

17. A non-transitory computer-readable medium having stored thereon instructions which, when executed by a computer, cause the computer to carry out the method according to claim 1.

* * * * *